United States Patent Office 2,959,574
Patented Nov. 8, 1960

2,959,574

WATER-SOLUBLE REACTION COMPOSITION OF HYDROXYLAMINE WITH ACRYLAMIDE-ACRYLONITRILE COPOLYMER

Norman T. Woodberry, Stamford, Conn., assignor to American Cyanamid Company, New York, N.Y., a corporation of Maine No Drawing. Filed Feb. 17, 1958, Ser. No. 715,483

2 Claims. (Cl. 260—85.5)

This invention relates to water-soluble resinous compositions and more particularly to water-soluble copolymeric acrylamidoxime resins of acrylonitrile and acrylamide.

I have discovered that when copolymers of acrylonitrile and acrylamide containing at least one weight percent acrylonitrile are treated with hydroxylamine either as a free base, or salts thereof which furnish hydroxylamine, that a highly desirable and useful resinous product is obtained. The polyacrylamidoxime products prepared according to the invention have ampholytic properties, i.e., the products yield hydrogen or hydroxyl ions according to the pH value of the solvent. The precise mechanism which takes place during the reaction of the hydroxylamine with the acrylamide-acrylonitrile copolymer and the structural configuration of the product is not known. The treatment of water-insoluble polymers containing predominant amounts of acrylonitrile has been conducted in the past. In such instances, it has been desirable to modify the dyeing properties of such polymers and only a superficial change in the polymer has been effected in order to make them more receptive to dyeing. I have found, however, by employing the reaction conditions hereinafter more fully described, that the whole nature of the copolymer is altered to provide a novel and useful composition. In the case of acrylonitrile homopolymers or copolymers of acrylonitrile with monomers other than acrylamide, it has been heretofore postulated that the reaction occurs mainly on a nitrile group. The unique properties of the reaction product of the water-soluble acrylonitrile-acrylamide copolymers with the hydroxylamine, on the other hand, suggests that the amido group of the acrylamide is also in part involved and is responsible for the behavior of the composition.

The copolymeric amidoxime compositions having the desired characteristics are those having at least five weight percent and not more than 30 weight percent acrylonitrile and correspondingly, from 95 weight percent to 70 weight percent acrylamide. A particularly exceptional composition is obtained when a copolymer containing from 15 to 25 weight percent acrylonitrile and from 85 to 75 weight percent acrylamide is utilized.

In the copolymerization of the acrylamide and acrylonitrile, any of the conventional methods of copolymerization may be employed.

The novel polyacrylamidoxime ampholytes are water-soluble and have been found very useful in such illustrative applications as sedimentation or flocculating agents, for ore and industrial waste treatment, in mineral treatment, as coating compositions, in film-forming, for producing wrapping material, as thickeners, as protective colloids, in adhesive formulations and as drilling mud additives. The principal object of the present invention is to provide novel water-soluble resinous compositions comprising copolymers of acrylonitrile and acrylamide containing amidoxime groups. Other objects and advantages will become apparent from the specification as a whole and from the examples hereinafter set forth.

In conducting the reaction to produce the amidoxime resinous composition of the invention, the hydroxylamine as a free base may be employed in treating the acrylamide-acrylonitrile copolymer, although in practice, the commercially available stable salts of hydroxylamine, such as hydroxylamine hydrochloride, hydroxylamine sulfate, and hydroxylamine acid sulfate are preferably employed. When the salt is used, the treating liquor includes a substantially equivalent amount of alkali for the purpose of liberating the hydroxylamine from its salts to provide free hydroxylamine to react with the copolymer. Suitable alkalies for this purpose are such as sodium hydroxide, sodium carbonate, and various other alkali metal and alkali earth metal carbonates and hydroxides or organic amines, such as ammonium hydroxide, potassium hydroxide, ethylene diamine, triethanol amine and the like.

The temperature of the reaction which may be employed varies over a substantial range, i.e. from about room temperature to reflux, although preferably, the temperature of reaction is maintained from about 60° C. to 95° C. When the reaction is conducted below about 60° C., the reaction is somewhat sluggish; while with temperatures in excess of about 95°, there is some evidence of deterioration of the product. The duration of the treatment may be varied over fairly wide limits and treatments from about 10 minutes to about 3 hours give good results. No deleterious effect is apparent on the product when the reaction is conducted for longer periods. The only limitation thus placed on longer reaction times is a practical one.

It is important that the pH during the course of the reaction with the hydroxlamine does not exceed the upper limit of 8 and generally the reaction may be conducted within the range of pH of 3.8 to 8, although the preferred reaction is conducted at a pH within the range of 5 to 7. The amount of hydroxylamine which is employed may vary from about 5 mole percent to about 100 mole percent based on the acrylonitrile content present in the copolymer.

In preparing the acrylamide-acrylonitrile copolymer to be employed in preparing the amidoxime composition of the invention, commercially available copolymers of this composition containing the requisite proportions may be employed or the copolymer may be prepared by conventional polymerization techniques.

In order that the present invention may be more fully understood, the following examples are set forth for purposes of illustration only. The specific enumeration of details should not be interpreted as a limitation except as specified in the appended claims. All parts are expressed as parts by weight unless expressly stated otherwise.

*Example 1*

Into a suitable reaction vessel equipped with stirrer, thermometer, inert gas inlet and a charging inlet are charged 800 parts of acrylamide and 200 parts of acrylonitrile into 9000 parts of distilled water which has been previously purged with carbon dioxide. The solution is heated to 70° C. and 2.2 parts of potassium persulfate are introduced into the reaction mixture. After 5 hours of heating, the resin solution is cooled to room temperature and freed of unreacted acrylonitrile by vacuum stripping. A copolymer is obtained containing approximately 16% by weight acrylonitrile and 84% by weight acrylamide having a molecular weight of about 500,000 as determined from viscosity measurements using the Staudinger equation.

The average molecular weight of the acrylamide-acrylonitrile copolymer reacted with hydroxylamine may vary widely as desired or as conditions may require, but ordinarily is within the range of from about 50,000 to about 2,000,000 or more as calculated from viscosity measurements using the well-known Staudinger equation; or by using an average molecular weight as determined by other known methods and converting the value thereby obtained to a "Staudinger" average molecular weight.

*Example 2*

7.9 parts of solid 70:30 acrylamide-acrylonitrile copolymer is introduced into a suitable reaction vessel containing 395 parts of water. 3.105 parts of hydroxylamine hydrochloride in 60 ml. of 2% aqueous alkali is also charged into the vessel and the reaction mixture is heated under agitation for 1 hour at 98° C. at a pH of 5.8. The solution is cooled to room temperature. The product is useful as the aqueous solution obtained and diluted, and as such is employed as a flocculating agent in settling ore and coal slimes. The product may, however, be separated by precipitating in methanol and dried to produce a free-flowing powder which is redissolvable in water.

*Example 3*

5 parts of solid 80:20 acrylamide-acrylonitrile copolymer is introduced into 100 parts of water in a suitable reaction vessel and 1.31 parts hydroxylamine hydrochloride are charged thereto. The pH of the solution is adjusted from 3.5 to 6.3 with dilute aqueous sodium hydroxide. The mixture is heated to 70° C. and maintained at this temperature while the reaction mixture is vigorously agitated for 30 minutes. The solution is cooled to room temperature, precipitated in methanol, and dried to yield 5.95 parts of a white free-flowing powder which is redissolvable in water.

*Example 4*

100 parts of a 5% aqueous 80:20 acrylamide-acrylonitrile copolymer solution, 0.655 part of hydroxylamine hydrochloride which is the theroretical quantity required to convert one-half of the nitrile groups, and 14 parts of 0.5 N NaOH solution are introduced into a suitable reaction vessel. The mixture is heated for 30 minutes at 70° C. while stirring at a pH of 6. The product solution obtained is adjusted to a 1.5% solution of amidoxime product and employed as an aid in settling ore slimes.

*Example 5*

100 parts of a 2% solution of 75:25 acrylamide-acrylonitrile copolymer is introduced into a suitable reaction vessel with 20 parts of water. 0.648 part of hydroxylamine hydrochloride and one-half the theoretical amount of the aqueous alkali needed to neutralize the hydroxylamine hydrochloride is charged into the vessel giving a pH of 5.5. The mixture is reacted at this pH (5.5) for one hour at 70° C. A free-flowing resin is isolated.

*Example 6*

98.8 parts of hydroxylammonium acid sulfate is dissolved in 200 parts of water and neutralized with 50 parts of sodium hydroxide (as a 20% aqueous solution) and charged into a suitable reaction vessel containing 1,000 parts of a 20% solution of 80:20 acrylamide-acrylonitrile copolymer. The mixture is stirred and heated to 70° C. and has a pH of 6.2. The mixture is heated for one hour at 70° C. followed by cooling to room temperature. The product is separated by precipitating in methanol, washed twice with successive methanol portions and dried under vacuum desiccation to yield a free-flowing powder which is dissolvable in water.

I claim:

1. A polyacrylamidoxime water-soluble resinous composition obtained by reacting a copolymer of from about 5 weight percent to about 30 weight percent acrylonitrile and from about 95 weight percent to about 70 weight percent acrylamide with hydroxylamine, said hydroxylamine being employed in amounts of from 5 mole percent to about 100 mole percent based on the acrylonitrile present in the copolymer, at a pH of between 3.8 and 8.0.

2. A polyacrylamidoxime water-soluble resinous composition obtained by reacting a copolymer of from 15 to 25 weight percent acrylonitrile and from 85 to 75 weight percent acrylamide with hydroxylamine, said hydroxylamine being employed in amounts of from 5 mole percent to about 100 mole percent based on the acrylonitrile present in the copolymer at a pH of between 3.8 and 8.0.

References Cited in the file of this patent

UNITED STATES PATENTS

| 2,671,066 | Justice | Mar. 2, 1954 |
| 2,792,276 | Kaupin et al. | May 14, 1957 |
| 2,831,841 | Jones | Apr. 22, 1958 |

FOREIGN PATENTS

| 786,960 | Great Britain | Nov. 27, 1957 |